Aug. 9, 1938. S. DEBUS 2,126,369
DRIVE FOR RECIPROCATING BREAD SLICING MACHINES
Filed March 1, 1934 3 Sheets-Sheet 1
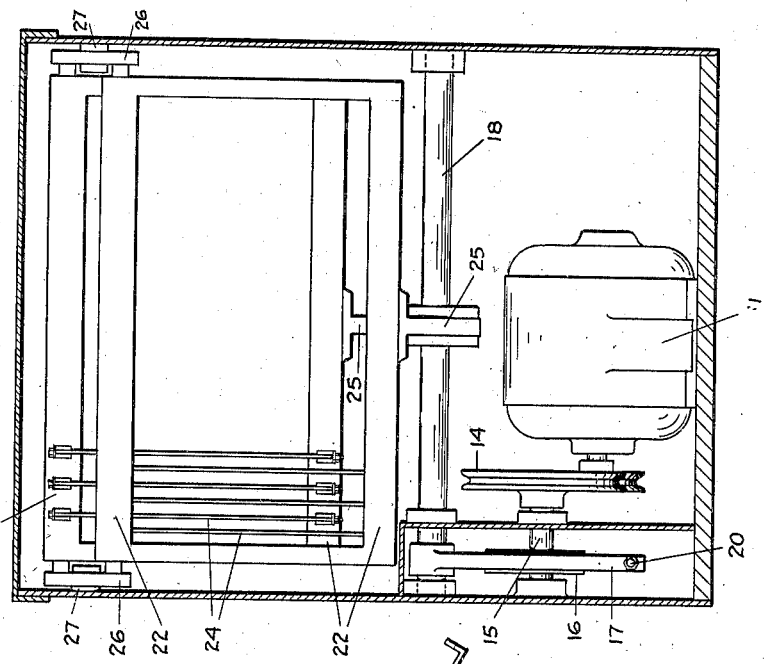
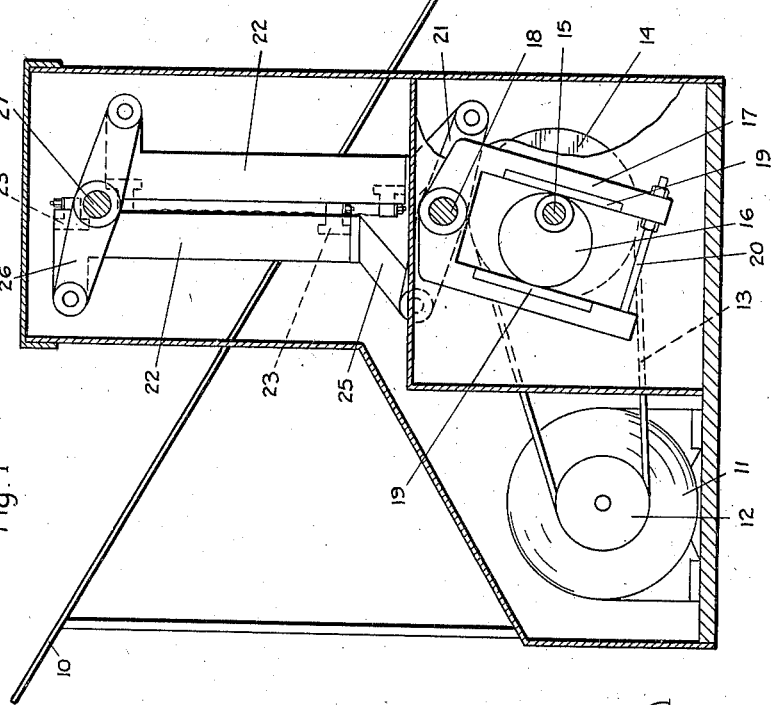
Inventor
S. Debus

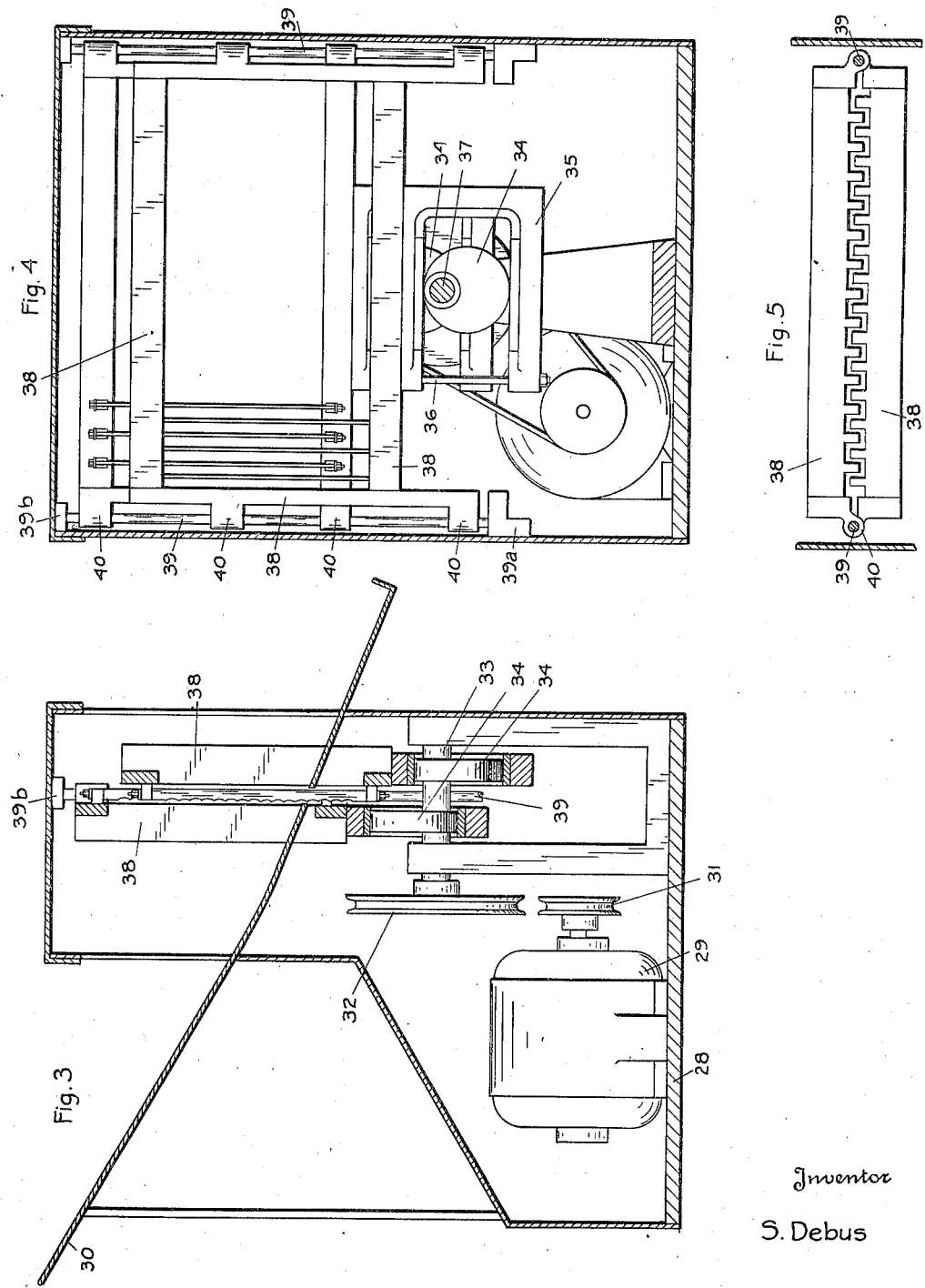

Aug. 9, 1938.　　　　　S. DEBUS　　　　　2,126,369
DRIVE FOR RECIPROCATING BREAD SLICING MACHINES
Filed March 1, 1934　　　3 Sheets-Sheet 3
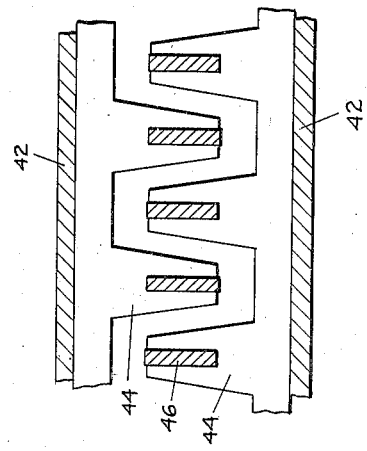
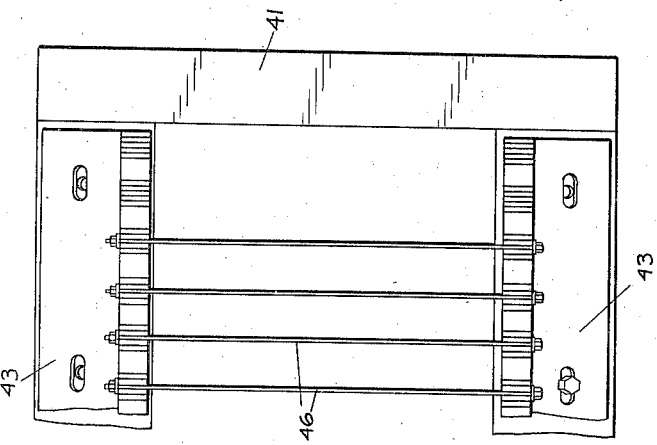
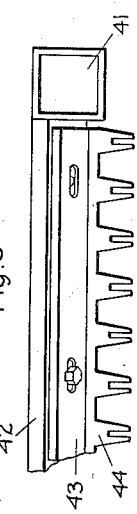
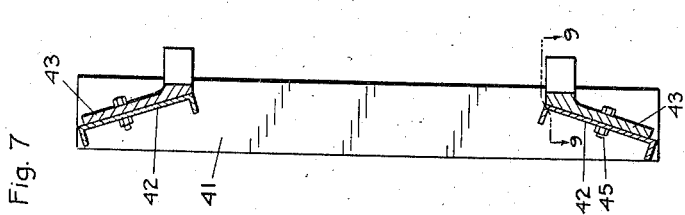
Inventor
S. Debus
By Emil F. Lange
Attorney Patented Aug. 9, 1938

2,126,369

UNITED STATES PATENT OFFICE 2,126,369

DRIVE FOR RECIPROCATING BREAD SLICING MACHINES

Sander Debus, Hastings, Nebr., assignor to U. S. Slicing Machine Company, a corporation of Indiana Application March 1, 1934, Serial No. 713,488

2 Claims. (Cl. 146—153)

My invention relates to bread slicing machines, one of its main objects being the provision of a driving mechanism for the alternate reciprocation of two knife carrying frames at the expenditure of the minimum of power.

Another object is the provision of a drive for a reciprocating bread slicing machine in which the movement in the drive is continuous to thereby avoid the jerking occurring at every change of direction in the movements of the reciprocating knives as found in most prior machines of this type.

Another of my objects is the provision of a mechanism having a small number of parts which are conveniently arranged for assemblage and for access in adjustment.

Another of my objects is the provision of a rectangular knife frame which is nonwarping.

Still another object of the invention is the provision of novel means for attaching the knives to the knife frame to make it possible to insert and replace knives with a minimum of effort and in the minimum of time.

Having in view these objects and others which will be pointed out in the following description, I will now refer to the drawings, in which Figure 1 is a view in side elevation of one form of my bread slicing machine, the side wall being removed to disclose the interior parts.

Figure 2 is a front elevation of the bread slicing machine shown in Figure 1, the front wall being removed.

Figure 3 is a view similar to Figure 1 but showing a slight modification in the driving mechanism.

Figure 4 is a view similar to Figure 2 but showing the driving mechanism employed in the Figure 3 construction.

Figure 5 is a plan view showing the two knife frames in their relation to each other and in their relation to the guide rods.

Figure 6 is a view in elevation showing a portion of the knife frames.

Figure 7 is a view in end elevation of the structure shown in Figure 6, one of the two side rails being omitted.

Figure 8 is a plan view of the structure shown in Figures 6 and 7.

Figure 9 is a view of a fragment of the two knife frames as seen in a transverse section of the knives immediately above the forks, the view showing particularly the cooperative relation between the two knife carrying frames.

The frame of the bread slicing machine includes a casing having a lower chamber for the motor and the driving mechanism and an upper chamber which serves as a bread slicing chamber. The upper chamber is open at its front and rear to permit the passage therethrough of the loaves of bread which are guided on a gravity chute 10 which passes through the upper chamber.

The lower chamber of the casing contains a motor 11 preferably of the electric type. The motor pulley 12 is connected by means of a belt 13 to a pulley 14 on the shaft 15. The rotation of the motor 11 is therefore communicated to the shaft 15. Secured to the shaft 15 to rotate therewith is a cam 16 which is embraced in a yoke 17 which in turn is secured to rock about a shaft 18.

The cam 16 and the wearing plates 19 of the yoke 17 are preferably of case or pack hardened steel or similar suitable material. The yoke 17 is furthermore provided with means for taking up the wear of the cam and the wearing surfaces on the plates 19. The takeup bolts 20 may be tightened slightly whenever the wear on the parts become such as to result in any irregularities in the movements of the cam and the yoke relative to each other.

The rocker arm 21 is secured to the rock shaft 18, the rocker arm 21 being designed to reciprocate the two knife frames 22. These knife frames are rectangular as shown in Figure 2 and they are positioned in parallelism with each other. Each knife frame is provided with knife-holding lugs 23 at the upper and lower extremities thereof. The knives 24 are secured to the lugs 23 in a manner to be subsequently described. The cutting edges of the knives of each knife frame lie in a common plane but the knives of the two frames move toward and away from each other through a slight distance. This is accomplished by the devices used for reciprocating the two knife frames 22.

As shown in Figures 1 and 2 the arms 25 project rigidly from the knife frames 22. These arms are pivotally connected to the rocker arm 21 at opposite extremities thereof. A pair of rocker arms 26 mounted on the stub shafts 27 are positioned in the upper part of the slicing chamber of the casing. The rocker arm 26 is substantially the same length as that of the rocker arm 21. The knife frames 22 are both provided with outwardly extending projections which are pivotally secured to the rocker arm 26 at its opposite extremities. The result is that the rocking movements of the rocker arm 21 are communicated to the knife frames 22 to alternately reciprocate the knife frames in opposite directions. Another result is that the reciprocation of the knife frames 22 is accompanied by a slight movement of the knife frames toward and away from each other, the knives of the knife frames being momentarily in a common plane.

A similar construction is employed in the bread slicing machine shown in Figures 3, 4 and 5. The frame 28 is identical with that shown in Figures 1 and 2 and the position of the motor 29 in the frame is also the same. The chute 30 passes through the openings in the slicing chamber as in the Figure 1 construction. The motor pulley 31 is connected by means of a belt to the pulley 32 on the shaft 33. This shaft carries two cams 34 which are embraced in horizontally positioned yokes 35. These yokes are provided with wearing plates similar to the plates 19 of the yokes 17 and they are also provided with takeup bolts 36 which are similar to the takeup bolts 20 in Figure 1. The rotary movement of the shaft 37 is communicated to the two cams 34 which cause alternate reciprocation of the two yokes 35. These yokes move in an up and down direction. The yokes 35 are rigidly secured to the respecive knife frames 38 to impart reciprocatory movements to the knife frames. To provide steady movements to the knife frames I employ a pair of guide rods 39 positioned at opposite edges of the knife frame and substantially midway between them as shown in Figure 5. Each knife frame is provided with a pair of spaced apart clips 40 which are so positioned that they do not interfere with each other during the reciprocation of the knife frames. These clips surround the rods 39 as best shown in Figure 5 but they slide freely up and down on the rods 39 which prevent movement of the knife frames except in a vertical up or down direction. The rods 39 are firmly anchored in brackets 39a and their upper ends are seated in the brackets 39b which are secured to the top cover of the casing. The top cover is removable and the removal of the top cover exposes the upper extremities of the rods 39 so that the knife frames can be readily lifted out of the casing when it is desired to change or adjust the knives.

The knife frames as shown in Figures 7 to 9, inclusive, are rectangular in form. Each frame has two side rails 41 which are in the form of square tubes as shown in Figure 8. The top and bottom rails 42 are in the form of channel steel beams which are secured to the side rails 41 at the angle shown in Figure 7 with their lower extremities directed inwardly. The side rails 41 and the end rails 42 are preferably made from steel and in both cases their shapes are such as to provide rigidity for the frame as a whole. In reciprocating knife frames which travel at a high rate of speed, it is vital that the operation be smooth and that the frame be not subject to even the slightest twisting or warping which would destroy the smoothness of operation.

Each channel steel end rail is provided with two or more apertures as best shown in Figure 6. These apertures are positioned in horizontal alignment. The knife holding castings 43 are provided with slots registering with the apertures of the end rails 42. Each casting 43 has a portion in contact with an end rail 42 as shown in Figure 7 and it also has a comb projecting inwardly with reference to the knife frame. The comb is in the form as best shown in Figures 8 and 9. The forks 44 of the comb consist each of two tines for receiving a bread slicing knife between them. The upper and lower comb 44 are identical in shape and size, their only difference being in their manner of positioning with reference to the knife frame as a whole. They are carefully machined to space the knife receiving slots at equal distances throughout. The distance between two consecutive knife carrying slots of a single comb is twice the thickness of the slice which is to be cut from the loaf. The combs of the two knives cooperate in the manner shown in Figure 9. The knife receiving slots in the two combs are in substantially transverse alignment and the combs are adjustable to bring these slots into position such that all of the slots will be equidistantly spaced. This is accomplished by shifting either knife carrying frame laterally until the slots of its comb are spaced equidistantly from the slots of the cooperating comb. In doing this it is only necessary to see that one of these slots is equidistantly spaced from the two adjacent slots since the machining of the combs is such that all other slots will be equidistantly spaced when this adjustment has been obtained on one slot between two adjacent slots. They are then locked together in adjusted position by means of the bolts and nuts 45. After they are thus locked together the knives may be inserted in the slots of the combs 44 so as to span the space between the combs 44 of the two castings 43. In this position the knives 46 may then be anchored and adjustably tensioned by means of any desired devices.

In the prior bread slicing machines of the reciprocating knife type, two serious difficulties have been encountered especially in connection with the small machines designed for use in small bakeries and by dealers. In the first place, the power consumption is altogether too great and it necessitates too large a motor. This makes it impossible to provide a compact machine and it very often necessitates special wiring installations and makes it impossible to plug into the ordinary sockets. In the second place, the two knife frames which reciprocate in opposite directions have drives in which there is a distinct "slap" at each reversal of the movement of the knife frames. This makes the operation noisy and it tends to reduce the life of the machine. In my bread slicing machine as above described the movement of the cam in the yoke is continuous and quiet running. It has also been found that the power consumption is so small that a light motor may be used on the power of the ordinary light circuit found in every bakery and small shop. Both the cost of manufacture and cost of operation of the present bread slicing machine are materially less than that of prior machines of this kind.

Having thus described my invention in such full, clear, and exact terms that its construction and operation will be readily understood by others skilled in the art to which it pertains, what I claim as new and desire to secure by Letters Patent of the United States is:

1. In a bread slicing machine, a pair of interfitting knife frames, each of said knife frames consisting of a pair of side rails and top and bottom rails secured together in rectangular relation, brackets secured to said top and bottom rails of both of said knife frames, each of said brackets having comblike members interfitting with the comblike members of the opposite of said knife frames, parallel knives secured at their extremities to said comblike members of both of said knife frames, means for reciprocating one of said knife frames, said means including a cam and a yoke embraced thereby and a connection between said yoke and a knife frame, and means for maintaining the knives of both of said knife frames in substantial parallelism, said latter means holding said frames in parallelism during the reciprocation of the frames while simultaneously moving said frames toward or away from each other.

2. A bread slicing machine comprising a supporting frame, a pair of knife-carrying frames mounted in confronting spaced relation, said frames having top and bottom rails, a set of slicing knives carried by each frame on the confronting side thereof, each knife frame also having a corresponding pair of rearwardly extending arms rigidly secured to the top rail, the bottom rail of each knife frame likewise having at least one arm extending rearwardly, each bottom arm being similar and all the arms terminating in a pivotal bearing, means attaching said knife frames to said supporting frame for alternately directed reciprocating motion, said means including upper rocker arms in pairs having a common pivot on the supporting frame and independent pivots in the pivotal bearings of the upper arms of the knife frames, and lower similar rocker arms having a common pivot on the supporting frame and independent pivots on the lower arms of the knife frames, said common pivots lying in the same plane as the knives, and means imparting reciprocatory motion to said frames.

SANDER DEBUS.